Patented Mar. 16, 1954

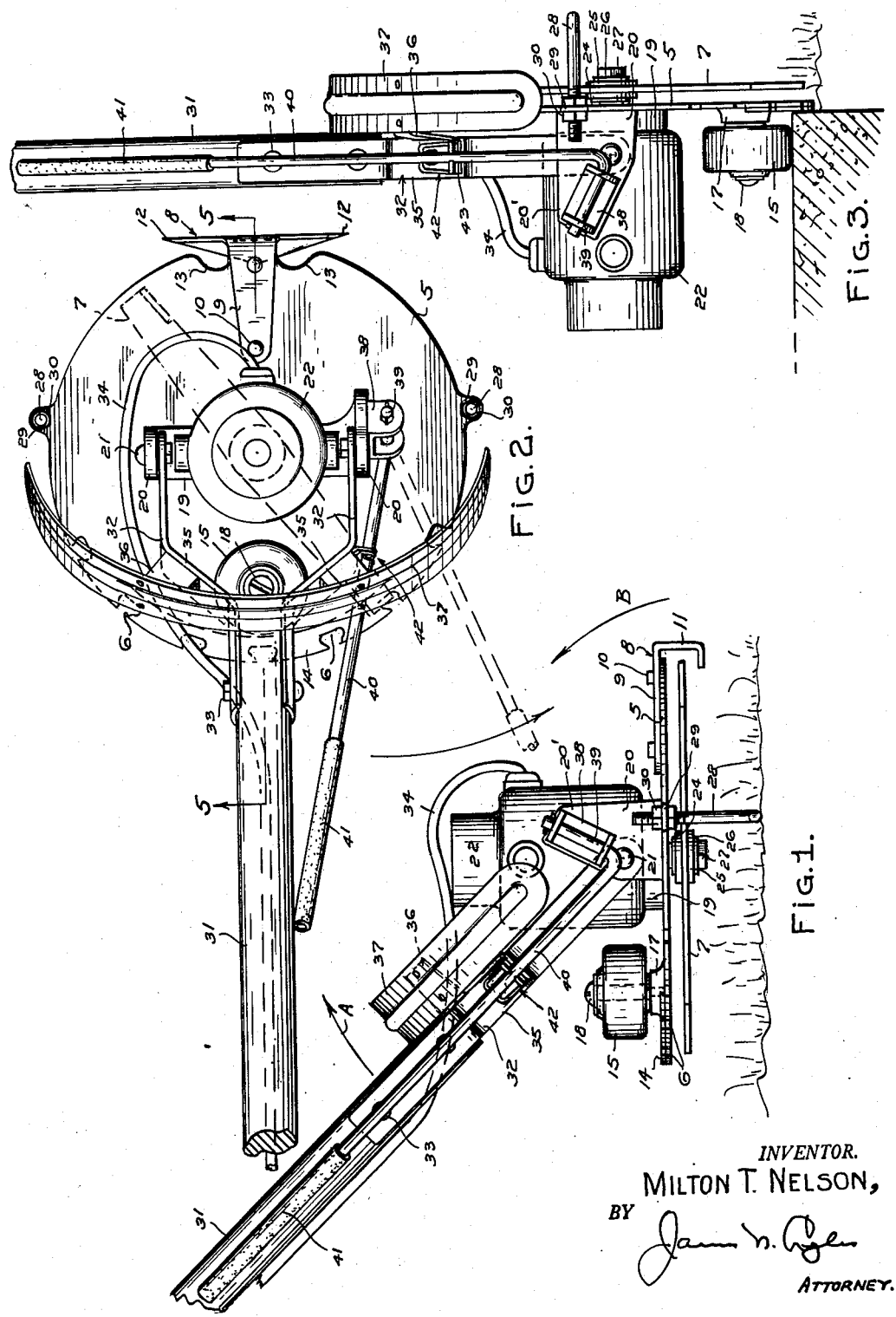

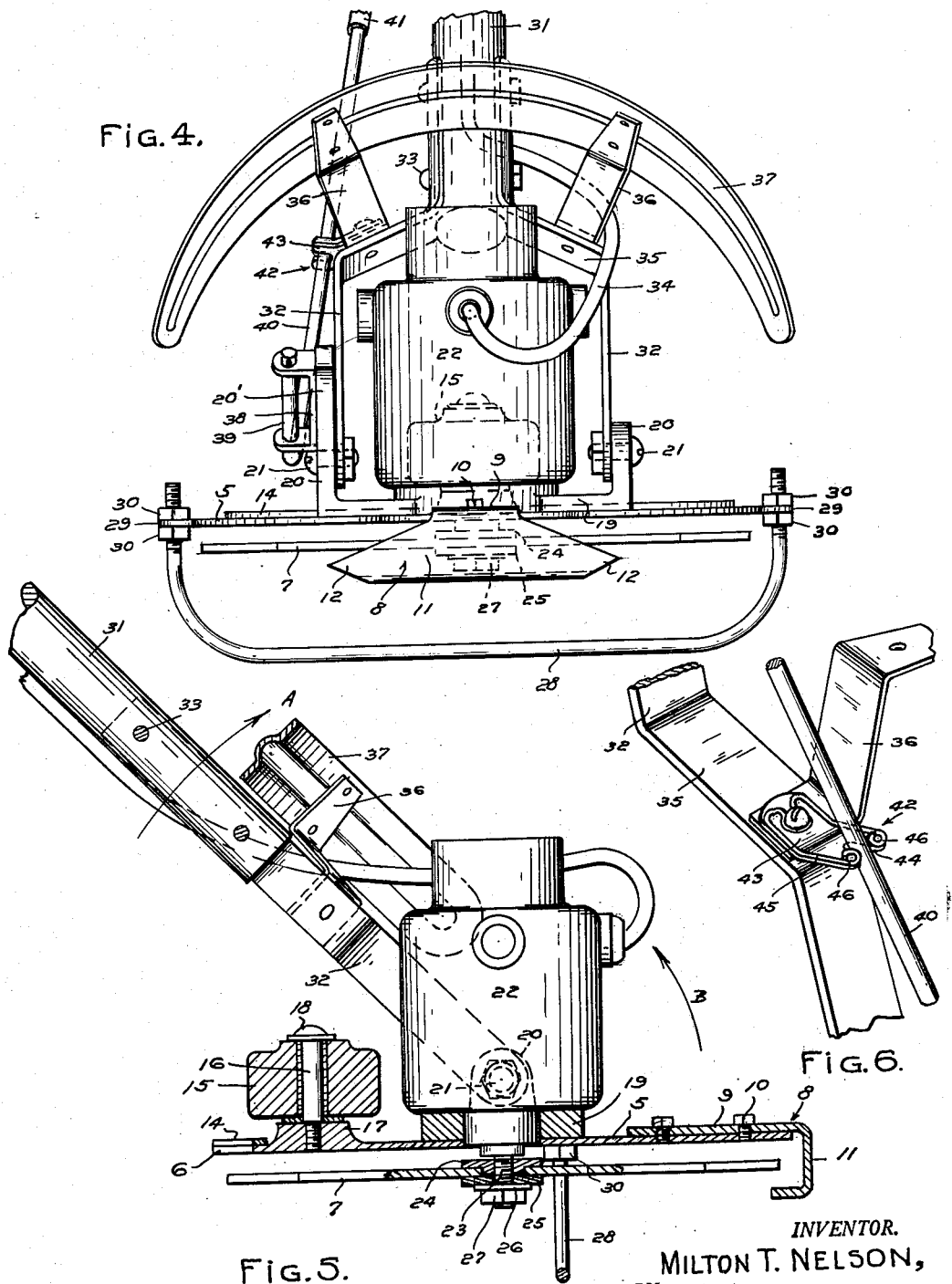

2,672,002

UNITED STATES PATENT OFFICE 2,672,002

LAWN TRIMMER AND EDGER

Milton T. Nelson, Miami, Fla.

Application January 30, 1953, Serial No. 334,289

6 Claims. (Cl. 56—25.4)

1

This invention relates to a combined grass trimmer and edger of the type that is generally electrically driven.

The invention has for its prime object the provision of a grass trimmer that is adapted to be manually shifted over the area of a lawn to be trimmed with adjustable ground engaging means to determine the depth of cut.

A further and most outstanding purpose of the device is the provision of a handle assembly that is connected with the trimmer in a novel manner which permits a simple and positive shifting of the cutter from a position of horizontal cutting to a position of vertical cutting when the device is to be employed as an edger, with means associated with the cutter and the handle assembly to quickly and simply lock the cutter in either of its positions of adjustment.

A still further object of the invention resides in a novel gauge roller carried by the cutter that engages upon the edge of a sidewalk, curbing or the like to limit accurately the depth of cut when the device is employed as an edger and with a novel replaceable wear strip that bears against the side of the walk or curbing for absorbing the wear that would normally be imparted to the cutter plate by the rubbing contact with the edge of the walk.

A still further object of the invention resides in an improved guard against flying grass, stones or the like that is shiftable with the handle to overlie the cutter blade when the device has been adjusted to the edging position.

Other features of novel construction and operation will be more apparent during the course of the following description, reference being had to the accompanying drawings, wherein has been illustrated a preferred form of the device and wherein like characters of reference are employed to denote like parts throughout.

In the drawings:

Figure 1 is a side elevation of the device constructed in accordance with the invention and shown in the position for grass trimming, Figure 2 is a plan view thereof, Figure 3 is a side elevation with the device adjusted to the edging position, Figure 4 is a front elevation of the device in the trimming position of Figure 1, Figure 5 is a central vertical longitudinal section, taken on line 5—5 of Figure 2 and, Figure 6 is a fragmentary perspective view of the locking means between the handle assembly and the cutter.

Referring specifically to the drawings, the numeral 5 designates a base plate for the cutter assembly, circular in top plan and formed of suitable metal having adequate rigidity against flexing. At its rear portion for part of its circumference, the plate 5 is notched at 6, as a means to direct and comb the grass into the field of rotary cutting motion of a double end cutting blade 7, to be more clearly detailed later. Forwardly and centrally of the plate 5, a combined guard and gauge 8 extends beyond the plate as a means to limit the manual shifting of the cutter device around a wall or other obstruction. The guard 8 is generally T-shaped and comprises a flat leg portion 9 that is riveted or bolted to the plate 5, as at 10. The guard 8 is bent downwardly at a right angle and then inwardly at a right angle to underlie the plate 5 at an elevation below the field of cutting action of the blade 7. As clearly shown in Figure 4, the head 11 of the guard 8 is identically pointed at its opposite ends, as at 12 to facilitate the raking of the grass that grows close to the wall or other obstruction so that the grass is directed in the line of cutting motion of the blade 7. The plate 5, adjacent the pointed ends 12 is inwardly notched at 13 to insure that the grass will be engaged by the blade. Riveted or otherwise attached to the upper surface of the plate 5, to conform to the arcuate shape of the plate, is a wear strip 14, notched to register with the notches 6. The wear strip 14 serves to absorb the wear to which the surface of the plate would be subjected when the device is shifted along a sidewalk or curbing, when in the edging position, as shown in Figure 3. A roller 15, rotatably supported upon a shaft 16, serves as a means to gauge the depth of edging cut, by rolling along the upper surface of the walk. The roller 15 may be formed of wood, hard rubber or any other suitable material. The shaft 16 is shouldered, as shown and has its lower end threaded to engage a threaded opening in a boss 17 either integral with or welded to the surface of the plate 5. A slotted head 18 facilitates the removal of the shaft for replacement of the roller.

Rigidly connected with the upper surface of the plate 5 in any desirable manner, is a rigid casting 19, having upstanding ears 20 that are apertured for the reception of bolts 21, employed as a pivotal connection for a handle assembly, to be described. The casting 19 is formed a relatively wide at its central portion to form a base support for a prime mover, such as an electric motor 22, connected to the casting by bolts or screws, not shown. The casting and its supported motor are centrally arranged with respect to the plate 5 and the plate 5 and casting 19 are apertured identically for the passing of a portion of the motor housing which supports the usual and well known motor shaft bearing, not shown. This construction is clearly shown in Figure 5. The motor 22 is vertically arranged in normal trimming use and is fixed with respect to the plate 5. The motor 22 carries a depending threaded shaft extension 23 for the mounting support of a double end cutting blade 7. The blade is extended to opposite sides of the shaft an identical distance with the ends of the blade terminating at a point to be wholly disposed inwardly of the circumferential edge of the plate 5 as a safety measure against accidental engagement by the operator and as a safety measure against the blade engaging shrubbery or other objects. A shouldered washer 24 is threaded to engage upon the shaft 23 and a thrust washer 25 serves to retain the blade in securely mounted engagement with the washer 24. The blade in its assembled position upon the shaft 23 is held against displacement by a lock washer 26 and a retaining nut 27. The numeral 28 designates a ground runner of generally U-shape that is arranged transversely of the device and somewhat forwardly of the transverse center line of the plate and serves as a gauge to determine the depth of cutting action of the blade 7 and to also serve to support the weight of the device when shifted over the surface of the grass to be cut. The opposite legs of the runner are threaded at their upper ends and are adjustably engaged in apertured ears 29, integral with the plate. Nuts 30 above and below the ears serve to permit the vertical adjustment of the runner.

The handle assembly includes a preferably cylindrical handle portion 31, of wood or other desirable material and a pair of metallic bracket arms 32 connected upon opposite sides of the handle adjacent its lower end, by bolts 33. The lower portions of the arms 32 are parallel and are apertured at their lower ends for pivotal mounting support upon the bolts 21 as a means to pivotally support the handle in a manner that permits the handle and cutter to pivot with respect to each other. The handle 31 is obviously formed of a convenient length whereby the operator may easily and conveniently move the cutter over the area to be trimmed or edged. Any desirable cross head may be employed at the upper end of the handle and any suitable control switch, not shown will serve to energize the motor 22 through a conductor 34. It will thus be apparent that the handle and cutter assembly may be swung simultaneously in an arc to dispose both the cutter assembly and the handle in a vertical plane for use as an edging device, as shown in Figure 3. Secured to the inclined portions 35 of the bracket arms 32, are angle brackets 36 that are employed to support an arcuate guard 37, which guard 37, when the device has been shifted to the edging position, overlies the exposed cutting blade ends as a means to protect the user against accidental contact therewith. The guard 37 conforms substantially to the arc of the plate 5 and further protects the user against flying grass or possibly stones that the cutter blade 7 might engage.

Means are employed to fixedly position the position of the handle assembly with respect to the cutter assembly in either position of adjustment, as it will be apparent, that in either position of adjustment, the device must be held against freedom of pivotal movement. As clearly shown, one of the casting ears 29 is vertically extended, as at 20' and has fixed to its outer side, as by rivets or welding, a U-shaped bracket 38, the upper and lower parallel legs of which are axially apertured for the rotatable reception of an angularly formed end 39 of a cylindrical rod 40. End 39 extends above the upper leg and is pinned against displacement axially. Below the lower leg of the bracket 38, the rod is bent at an angle to dispose the rod proper in substantial alignment with the handle 31 and handle brackets 32. The upper end of the rod 40 is protected by a preferably rubber shield 41 as a means to protect the user against the transmission of electricity should the motor develop a short circuit. The means to retain the rod against pivotal movement accidentally, comprises a spring latch 42. The latch consists of an angle plate 43, one end of which overlies the bracket connection for the adjacent bracket 36 and is rigidly held against movement by the same rivet or bolt which holds the bracket. The plate 43 extends forwardly beyond the handle bracket, as shown best in Figure 6 with its forward end notched at 44 for the reception of the rod 40. A spring 45 is bent to underlie the rivet or bolt for the bracket 36 for a rigid mounting and the forward terminal ends of the spring are looped at 46 to normally partially overlie the notch 44 and in the path of lateral movement of the rod 40. The rod 40 is released by merely pulling the rod outwardly to disengage it from the spring ends 46, the rod swinging in an arc upon its pivotal mounting in the bracket 38. After the rod has been released from the latch 42 and swung outwardly a distance sufficient to clear the end of the guard 37, the cutter assembly and the handle assembly can then be pivotally swung to dispose the device in either desired position of use, after which the rod 40 is reengaged with the latch to hold the cutter assembly and handle assembly substantially rigid for its respective use.

It will be observed that despite the fact that the handle and cutter assemblies are swung through considerable arcs in reaching their trimming or edging positions, the latching rod 40 registers with the spring detent or latch 42 in each of the limits of adjustment of the two assemblies. This is accomplished by utilizing a simple rod 40 and providing the lower end of said rod with an end bent to an acute angle as at 39 and pivoting said angular end in the bracket 38 in such manner that the said rod may be swung completely over, that is, swung so that the side of said rod which engages in the spring latch or detent 42 in Figure 1, for example, is opposite the side of rod 40 which engages in said spring detent in Figure 3. Note that the handle 31 lies at substantially an angle of 45° to the base plate 5 in the trimming position of Figure 1, while said handle lies substantially parallel with said base plate in the edging position of Figure 3. The cutter assembly swing through an arc of 90° in moving from the horizontal position of Figure 1 to the vertical position of Figure 3 and the handle assembly, in addition moves through an angle of 45° in moving from the position of Figure 1 to the position of Figure 3. Thus there is an effective swing of 130° between these parts, and it is the provision of the end bent to an acute angle upon the latching rod 40 and the mounting of this rod to swing completely around to present its opposite side to the spring detent, which effects the necessary aligning of rod 40 and spring detent, with each other at each limit of movement of the parts.

In the use of the device, assuming that the parts are in the position shown in Figures 1, 2, 4 and 5, the operator proceeds to shove or push the device over the area to be trimmed, especially close to walls or shrubbery where it is not possible to use a conventional mower, the runner 28 at all times maintaining the cutter spaced from the ground the same height to impart a clean and even cut. Grass growing close to a wall or the like can be raked out and into the line of cutting action of the blade 7 by the guard 8. When the device is pulled toward the operator, the grass will enter the notches 6 to be engaged by the blade 7. When the device is to be used to edge along the edge of a sidewalk or curbing, the operator releases the rod 40 from the latch and swings it outwardly away from the handle 31 to a position beyond the end of the guard 37 and then simultaneously swings the handle assembly in the direction of the arrow A and the cutter assembly in the direction of the arrow B. This may be easily done by holding the handle with one hand and swinging the cutter assembly while holding the rod 40 with the other hand until they assume the relative position shown in Figure 3, after which the rod 40 is re-engaged in its latch 42 to maintain the parts in such adjusted position for edging. The device is then engaged with the area to be edged by resting the roller 15 on the edge of the walk, which will determine the depth of cut and successfully support the device to be shoved along the area to be edged. The wear plate 14 slides along the walk and absorbs the wear that would normally be imparted to the plate 5. The guard 37 successfully prevents the flying grass or stones from rising in a vertical direction.

It will be apparent from the foregoing that a very novel and desirable device has been provided to facilitate the trimming and edging of a lawn with a minimum effort. The parts are quickly and easily adjusted from one position to the other without the use of tools or other means separate from the machine. The parts are few and simple, are strong, durable and highly effective for the purposes noted. The device is light in weight and easily shifted about the lawn.

It is to be understood that while a preferred form of the device has been illustrated, changes are contemplated as readily fall within the spirit of the invention or the scope of the subjoined claims.

Having described my invention, what I claim as new and desire to secure by Letters Patent is:

1. A device of the character described comprising a cutter assembly and a handle assembly pivotally engaged with each other to permit said assemblies to be moved with respect to each other through substantially 90° to trimming and edging positions, and a latching mechanism for holding said assemblies in their trimming and edging positions, said latch mechanism comprising a detent and a movable member engageable with said detent to be retained thereby, said detent being carried by one of said assemblies and the movable member being pivoted to swing upon the other of said assemblies through such an arc as to present one of its sides to the detent when the assemblies are in trimming position and to present the other of its sides to the detent when said assemblies are in their edging position, the manner of pivoting said movable member upon its assembly being such that its throw establishes registry of said member and detent at each position of adjustment of the assemblies.

2. A device of the character described comprising a cutter assembly and a handle assembly pivotally engaged with each other to permit said assemblies to be moved with respect to each other through substantially 90° to trimming and edging positions, and a latching mechanism for holding said assemblies in their trimming and edging positions, said latch mechanism comprising a spring detent mounted upon the handle assembly and a latching rod carried by the cutter assembly, said rod comprising an elongated body portion which lies in substantial parallelism with the handle of the handle assembly and which rod is provided at its lower end with an angular bearing extension, and bearing portions carried by the cutter assembly in which said bearing extension is pivotally mounted.

3. A device of the character described comprising a cutter assembly and a handle assembly pivotally engaged with each other to permit said assemblies to be moved with respect to each other through substantially 90° to trimming and edging positions, and a latching mechanism for holding said assemblies in their trimming and edging positions, said latch mechanism comprising a spring detent mounted upon the handle assembly and a latching rod carried by the cutter assembly, said rod comprising an elongated body portion which lies in substantial parallelism with the handle of the handle assembly and which rod has its lower end bent to form a bearing extension which lies at an acute angle to the body portion of the rod and a bearing element upon the cutter assembly in which said angular end of the rod is pivoted, said spring detent presenting an open mouth facing outwardly from the handle and adapted to receive either side face of the rod and retain the same whenever the body portion of the rod lies in substantial alignment with the handle.

4. A device of the character described comprising a cutter assembly and a handle assembly pivotally engaged with each other to permit said assemblies to be moved with respect to each other through substantially 90° to trimming and edging positions, said cutter assembly comprising a base plate and a motor supporting casting having upstanding ears, a handle, handle carried bracket arms pivotally connected to said ears, a bracket carried by one of said ears, a latching rod comprising an elongated body portion and an inturned lower end which lies at an acute angle to said body portion, and which end is mounted to turn in openings formed in said bracket, a detent constructed to receive and hold said rod when the latter is swung toward the handle, the angularity of the lower end of the latching rod, and the arc of adjustment of the assemblies, with respect to each other, being such that when the assemblies are in edging position and the latch is engaged, the handle is held in substantial parallelism with the base plate, while when the assemblies are in cutting position and the latch is engaged, the handle is held at an angle of about 45° with respect to the base plate.

5. The device as in claim 4, wherein the base plate is provided with a bearing roller to support the assemblies for shifting movement along the edge of a sidewalk when the assemblies have been shifted to the edging position, the base plate being circumferentially notched adjacent the roller and a wear strip carried by the base plate upon that area which might contact an edge of the sidewalk, the wear strip shaped to conform to the circumferential edge of the base plate and with the wear strip having notches that register with the notches of the base plate.

6. The device as in claim 4, wherein the base plate is provided with a ground engaging runner to support the assemblies in a sliding movement and at a predetermined elevation above a lawn when the assemblies are shifted to a trimming position, the ground runner being vertically adjustable with respect to the base plate, the handle assembly supporting a guard that is shiftable with the handle assembly to overlie the edge of the base plate and a cutting blade when the assemblies are shifted to the edging position.

MILTON T. NELSON.

References Cited in the file of this patent

UNITED STATES PATENTS

| Number | Name | Date |
|---|---|---|
| 2,556,790 | Berdan | June 12, 1951 |
| 2,608,043 | Berdan | Aug. 26, 1952 |
| 2,621,463 | Skilman | Dec. 16, 1952 |
| 2,653,381 | Rooke | Sept. 29, 1953 |